US011131881B1

(12) United States Patent
Tseng

(10) Patent No.: US 11,131,881 B1
(45) Date of Patent: Sep. 28, 2021

(54) DISPLAY DEVICE

(71) Applicant: AU OPTRONICS CORPORATION, Hsin-Chu (TW)

(72) Inventor: Yi-Chun Tseng, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 0 days.

(21) Appl. No.: 17/010,056

(22) Filed: Sep. 2, 2020

(30) Foreign Application Priority Data

Jun. 9, 2020 (TW) ................................. 109119367

(51) Int. Cl.
*G02F 1/13357* (2006.01)

(52) U.S. Cl.
CPC .... *G02F 1/133605* (2013.01); *G02F 2202/28* (2013.01)

(58) Field of Classification Search
CPC ................................................ G02F 1/133605
USPC ....................................................... 362/97.1
See application file for complete search history.

(56) References Cited

U.S. PATENT DOCUMENTS

| 8,164,703 B2 | 4/2012 | Cheng et al. | |
|---|---|---|---|
| 10,663,784 B2 * | 5/2020 | Jiao | G02F 1/133553 |
| 2007/0211205 A1 * | 9/2007 | Shibata | F21V 29/74 |
| | | | 349/161 |
| 2011/0149200 A1 * | 6/2011 | Joo | G02F 1/133308 |
| | | | 349/61 |
| 2012/0050636 A1 * | 3/2012 | Jeong | G02F 1/133308 |
| | | | 349/58 |
| 2012/0250290 A1 * | 10/2012 | Park | G02F 1/133615 |
| | | | 362/97.1 |
| 2013/0242224 A1 * | 9/2013 | Yu | G02B 6/0085 |
| | | | 349/58 |
| 2013/0258702 A1 * | 10/2013 | Kim | G02F 1/133608 |
| | | | 362/602 |
| 2015/0233552 A1 * | 8/2015 | Callens | C09J 7/10 |
| | | | 362/97.1 |
| 2016/0147115 A1 * | 5/2016 | Lee | G02F 1/133608 |
| | | | 362/97.2 |
| 2017/0045774 A1 * | 2/2017 | Yoshikawa | G02F 1/133602 |
| 2020/0110311 A1 * | 4/2020 | Gordon | G02F 1/133608 |
| 2020/0379298 A1 * | 12/2020 | Notoshi | G02F 1/133611 |

FOREIGN PATENT DOCUMENTS

| TW | I281062 | 5/2007 |
|---|---|---|
| TW | 200825555 A | 6/2008 |
| TW | 200921190 A | 5/2009 |
| TW | I384297 | 2/2013 |

OTHER PUBLICATIONS

TIPO has issued the Office Action for the corresponding Taiwan application dated Feb. 26, 2021.

* cited by examiner

*Primary Examiner* — Bryon T Gyllstrom
(74) *Attorney, Agent, or Firm* — WPAT, PC

(57) ABSTRACT

A display device includes a backlight module. The backlight module includes a bezel defining a light source space and having a first portion and a second portion, the first portion disposed on one side of the light source space and having a groove, the second portion disposed on one side of the first portion away from the light source space and covering the groove, a light source unit disposed on the bezel and partially located in the light source space, and a first optical film having a first ear portion, the first optical film disposed over the light source unit and the first ear portion received in the groove.

16 Claims, 6 Drawing Sheets

DISPLAY DEVICE

BACKGROUND OF THE INVENTION

1. Field of the Invention

The invention generally relates to a display device. Particularly, the invention relates to a display device capable of positioning the optical film.

2. Description of the Prior Art

Flat and curved display devices have been widely applied to various electronic devices, such as mobile phones, wearable devices, televisions, host computers for transportation equipment, personal computers, digital cameras, and hand-held game consoles. However, in order to enhance the visual perception of the user, manufacturers are still continuously improving the optical performance of the display device.

In conventional display devices, optical films in the display device are usually positioned by the bezel. In order to ensure the relative positional relationship between the optical film and the display panel, an accommodating groove is usually opened directly on the side of the bezel. After the ear portion of the optical film extends into the accommodating groove, a fixing tape is then used to adhere the ear portion of the optical film through the accommodating groove from the upper side of the bezel. However, the accommodating groove is generally a through hole penetrating the bezel, so the optical film is only fixed by the tape in the normal direction of the optical film. When assembling, the ear portion possibly escapes from the accommodating groove due to shift of the optical film, and the optical film may be damaged due to the step difference caused by the thickness of the bezel when the optical film is attached by the tape.

SUMMARY OF THE INVENTION

It is an object of the invention to provide a display device, which can limit displacement of the optical film in multiple directions by the positioning mechanism of the bezel to effectively enhance the positioning of the optical film.

It is another object of the invention to provide a display device, which can avoid the shift of the optical film through the folding structure of the bezel, and can compensate the gap between the bezel and other components to increase the assembly efficiency.

In an embodiment, a display device includes a backlight module. The backlight module includes a bezel defining a light source space and having a first portion and a second portion, the first portion disposed on one side of the light source space and having a groove, the second portion disposed on one side of the first portion away from the light source space and covering the groove, a light source unit disposed on the bezel and partially located in the light source space; and a first optical film having a first ear portion, the first optical film disposed over the light source unit and the first ear portion received in the groove.

In an embodiment, the first portion has a through hole; the second portion is connected to the first portion and bent with respect to the first portion to be stacked on the first portion, so that the through hole becomes the groove.

In an embodiment, the second portion covers the first portion to form a substantially flat plane on the first portion.

In an embodiment, the second portion has a first end and a second end opposite to each other; the first end is connected to the first portion; the second end is substantially bent by 180 degrees relative to the first portion along an edge of the through hole adjacent to the first end, and the groove extends from the first end toward the second end.

In an embodiment, the bezel includes a bottom, a sidewall, and a top; the sidewall is connected between the bottom and the top to enclose the light source space; the top includes the first portion and the second portion, and the first portion is connected to the sidewall.

In an embodiment, the light source module further includes a first adhesive member; the first adhesive member is configured to adhere the second portion and the first ear portion.

In an embodiment, the first adhesive member includes a first adhesive portion and a second adhesive portion; the second adhesive portion is disposed corresponding to the groove; the first adhesive portion is attached to an upper surface of the second portion, and the second adhesive portion is bent into the groove to adhere an upper surface of the first ear portion and a lower surface of the second portion.

In an embodiment, the first adhesive member has a first adhesive surface and a second adhesive surface opposite to each other; a first surface portion of the first adhesive surface corresponding to the first adhesive portion adheres the upper surface of the second portion; a second surface portion of the first adhesive surface corresponding to the second adhesive portion adheres the lower surface of the second portion, and a portion of the second adhesive surface corresponding to the second adhesive portion adheres the upper surface of the ear portion.

In an embodiment, the first adhesive surface and the second adhesive surface include the same adhesive or different adhesives, and the first surface portion of the second adhesive surface corresponding to the first adhesive portion and the second surface portion of the second adhesive surface corresponding to the second adhesive portion include the same adhesive or different adhesives.

In an embodiment, the display device further includes a display panel, wherein the display panel is disposed on the bezel, and the first adhesive portion adheres the supper surface of the second portion and the display panel.

In an embodiment, the light source unit includes a light source and a light guide plate; the backlight module further includes a second optical film and a second adhesive member; the light source is disposed in the light source space; the light guide plate is disposed corresponding to the light source; the second optical film is disposed adjacent to the light guide plate and has a second ear portion received in the groove; the second adhesive member adheres a lower surface of the first portion and the second ear portion.

In an embodiment, the backlight module further includes a reflective film; the reflective film is at least partially located in the light source space between the light guide plate and the second optical film; the second adhesive member has a first adhesive surface and a second adhesive; the first adhesive surface of the second adhesive member adheres the lower surface of the first portion and the second ear portion, and the second adhesive surface of the second adhesive member adheres the reflective film.

Compared with the prior art, the display device of the invention can provide limitations to the optical film in multiple directions to effectively prevent the ear portion of the optical film from escaping so as to enhance the positioning of the optical film. Moreover, the display device of the invention has a positioning mechanism of folding design, so that the through hole of the bezel can become an accommodating groove after folding, and the gap between the bezel and other components can be compensated to facilitate the assembly of the display device.

DETAILED DESCRIPTION OF THE PREFERRED EMBODIMENT

Figure 1:
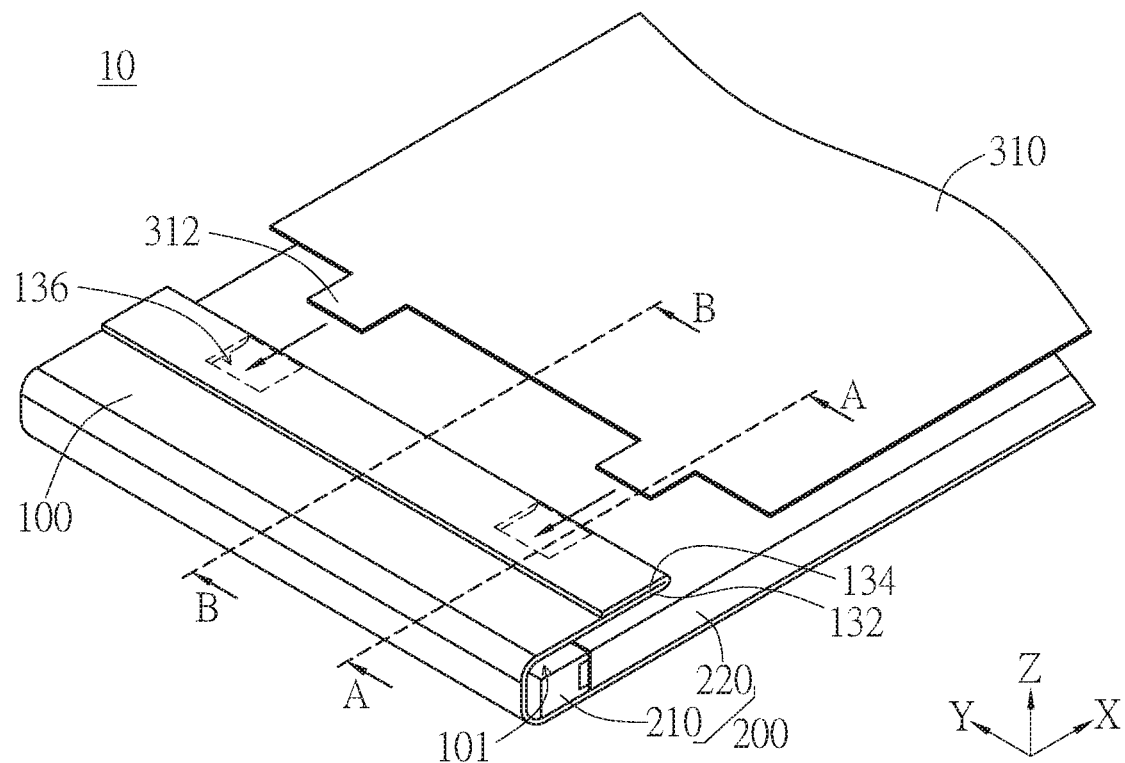
FIG. 1 is a partially exploded schematic view of an embodiment of the backlight module of the display device of the invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" or "connected to" another element, it can be directly on or connected to the other element or intervening elements may also be present. In contrast, when an element is referred to as being "directly on" or "directly connected to" another element, there are no intervening elements present. As used herein, "connection" can be referred to physical or electrical connection. Moreover, "electrically connecting" or "coupling" can have other elements between two elements.

It should be understood that, even though the terms such as "first", "second", "third" may be used to describe an element, a part, a region, a layer and/or a portion in the present specification, but these elements, parts, regions, layers and/or portions are not limited by such terms. Such terms are merely used to differentiate an element, a part, a region, a layer and/or a portion from another element, part, region, layer and/or portion. Therefore, in the following discussions, a first element, portion, region, layer or portion may be called a second element, portion, region, layer or portion, and do not depart from the teaching of the present disclosure.

The terminology used herein is only for the purpose of describing particular embodiments and is not restrictive. As used herein, unless the content clearly indicates, the singular forms "a", "an", and "the" are intended to include the plural forms, including "at least one." "Or" means "and/or". As used herein, the term "and/or" includes any and all combinations of one or more of the associated listed items. It should also be understood that when used in this specification, the terms "comprising" and/or "including" specify the presence or addition of the described features, regions, wholes, steps, operations, elements and/or components, but do not exclude one or the presence or addition of multiple other features, regions, wholes, steps, operations, elements, components, and/or combinations thereof.

In addition, the relative terms such as "below" or "bottom" and "above" or "top" may be used herein to describe the relationship of one element to another, as illustrated. It will be understood that the relative terms are intended to encompass different orientations of the device in addition to the orientation shown in the drawings. For example, if the device in the drawings is turned over, the elements described as being "below" the other elements will be oriented on the "upper" side of the other elements. Therefore, the exemplary term "below" may encompass the orientation of "below" and "above" depending on the particular orientation of the drawing. Similarly, if the device in the drawings is turned over, the elements described as being "above" the other elements will be oriented on the "lower" side of the other elements. Therefore, the exemplary term "above" may encompass the orientation of "above" and "below" depending on the particular orientation of the drawing.

"About", "approximately" or "substantially" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, ±20%, ±10%, ±5% of the stated value. Moreover, "about", "approximately" or "substantially" as used herein may select a more acceptable range of deviation or standard deviation depending on optical properties, etching properties, or other properties, without applying a standard deviation for all properties.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

The invention provides a display device, which includes a backlight module configured to provide a light source for displaying images. The display device of the invention can include, but not limited to, a liquid crystal display device or any suitable display devices.

Figure 2A:
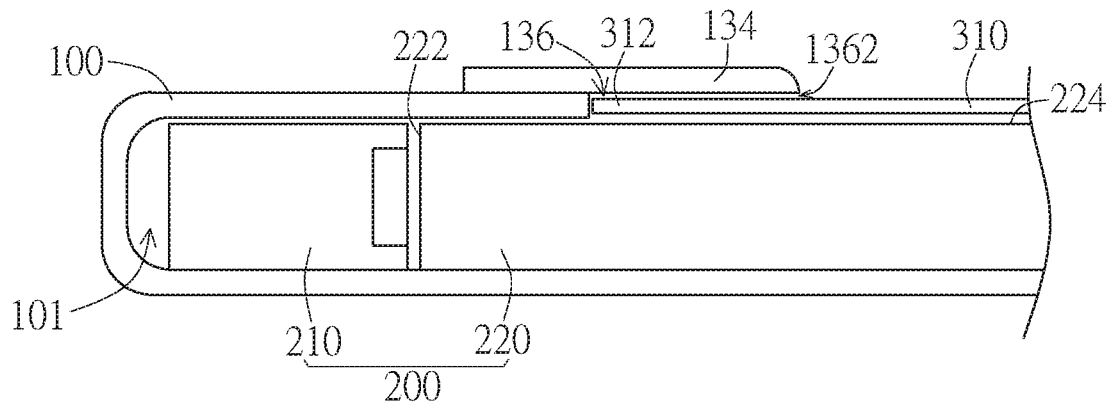
FIG. 2A and FIG. 2B are schematic cross-sectional views of FIG. 1 along cutting lines AA and BB, respectively.
Figure 2B:
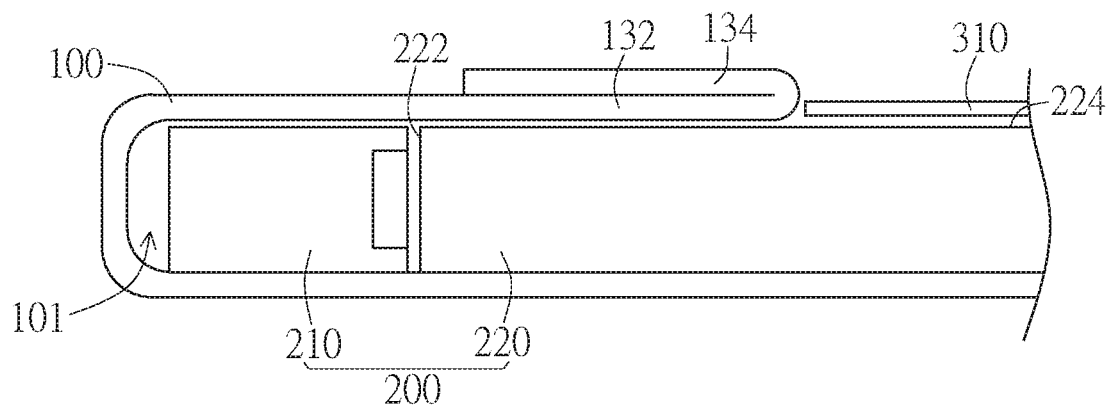

Referring to FIG. 1, FIG. 2A and FIG. 2B, FIG. 1 is a partially exploded schematic view of an embodiment of the backlight module of the display device of the invention; FIG. 2A and FIG. 2B are schematic cross-sectional views of FIG. 1 along cutting lines AA and BB, respectively. As shown in FIG. 1, FIG. 2A and FIG. 2B, the backlight module 100 includes a bezel 100, a light source unit 200, and at least one optical film, such as a first optical film 310. The bezel 100 defines a light source space 101, and the bezel 100 includes a first portion 132 and a second portion 134. The first portion 132 is disposed on one side of the light source space 101 and has a groove 136. The second portion 134 is disposed on one side of the first portion 132 away from the light source space 101 and covers the groove 136. The light source unit 200 is disposed on the bezel 100 and partially located in the light source space 101. The at least one optical film has at least one ear portion, such as a first ear portion 312 of the first optical film 310. The at least one optical film is disposed over the light source unit 200, and the first ear portion 312 is received in the groove 136.

Specifically, the at least one optical film may include one or more optical films, and the at least one ear portion may include one or more ear portions. In this embodiment, taking the first optical film 310 as an example, the first optical film 310 can have two first ear portions 312, and the two first ear portions 312 are disposed along a side of the first optical film 310, such as the side parallel to the Y-axis direction, and protrude from the optical film 310 along the X-axis direction, but not limited thereto. In other embodiments, according to practical applications, the first optical film 310 can include one or more first ear portions 312. Moreover, in another embodiment, the at least one optical film can include a plurality of optical films, and at least one of the plurality of optical films has the at least one ear portions. For example, in an embodiment, the plurality of optical films can be stacked or laminated on each other, and the ear portions of the plurality of optical films are aligned with each other to constitute a configuration similar to the first optical film 310, but not limited thereto. In another embodiment, only some of the plurality of optical films has the ear portions, and the ear portions are aligned or staggered to constitute a configuration similar to the first optical film 310. In other words, the first optical film 310 can be a single optical film, a stack of multiple optical films, or a composite optical film consisting of a plurality of optical films adhered to each other, and the first ear portion 312 can be a protruding portion of a single optical film or a stack of protruding portions of multiple optical films. In an embodiment, the optical film can include a diffusion film, a prism film, a brightness enhancement film, or a combination thereof. The size of the optical film corresponds to the size of the display device, and the optical film is selected according to the desired optical performance.

In an embodiment, the light source unit 200 can include a light source 210 and a light guide plate 220. When the light source unit 200 is disposed on the bezel 100, the light source 210 is located in the light source space 101 and configured to provide a light. The light guide plate 220 is disposed corresponding to the light source 210, so that the light provided by the light source 210 can enter the light guide plate 220 from the light entrance surface 222 and propagate along the light guide plate 220 to emit out from the light exit surface 224. For example, the light source 210 can be a light bar, which includes one or more light-emitting elements electrically connected to a light source circuit board. The light-emitting element can be, for example, a light-emitting diode, a laser diode, or any suitable light-emitting elements. The light source 210 can be arranged in the light source space 101 along the disposition direction of the first ear portions 312, such as along the Y-axis direction. In this embodiment, the light source 210 is disposed on the lateral side of the light guide plate 220, so that the light entrance surface 222 of the light guide plate 220 is the lateral surface corresponding to the light source 210, and the light exit surface 224 is the top surface of the light guide plate 220. Moreover, the light guide plate 220 can be partially located in the light source space 101; for example, one end of the light guide plate 220 with the light entrance surface 222 extends into the light source space 101 to face the light source 210, and the at least one optical film such as the first optical film 310 is disposed on the light exit surface 224 of the light guide plate 220. As such, the light provided by the light source 210 can enter the light guide plate 220 from the lateral surface, propagate along the light guide plate 220 to emit out from the top surface, and then transmit through the first optical film 310.

Figure 3:
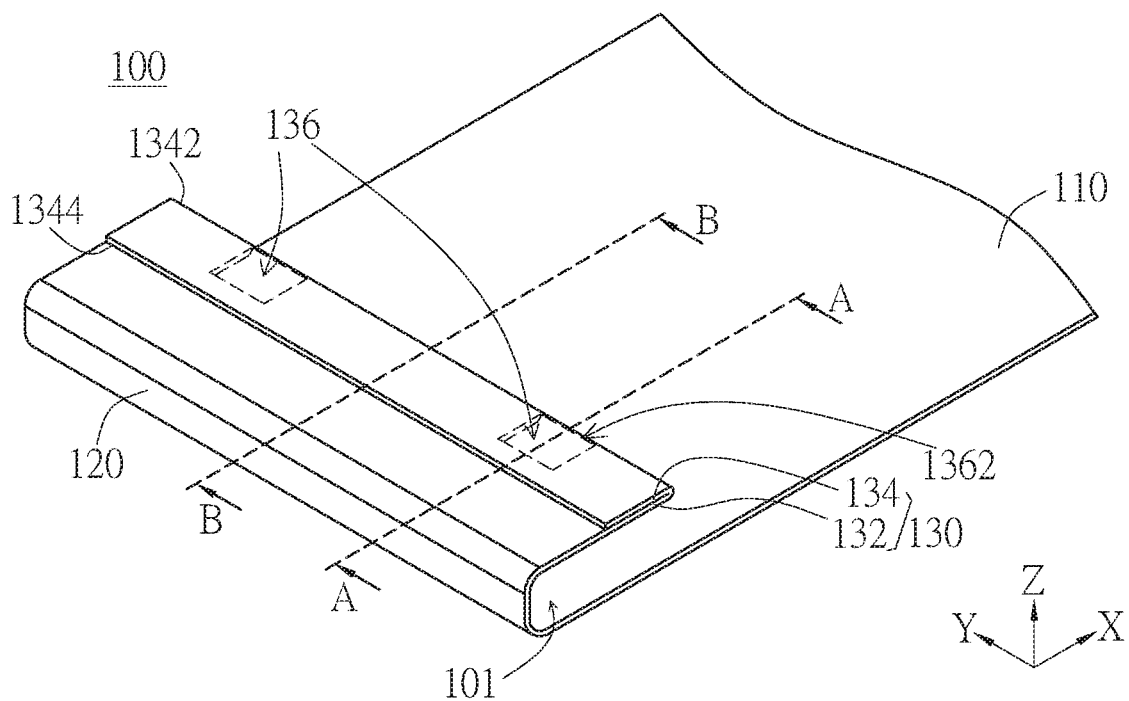
FIG. 3 is a schematic view of the bezel of FIG. 1.
Figure 4A:
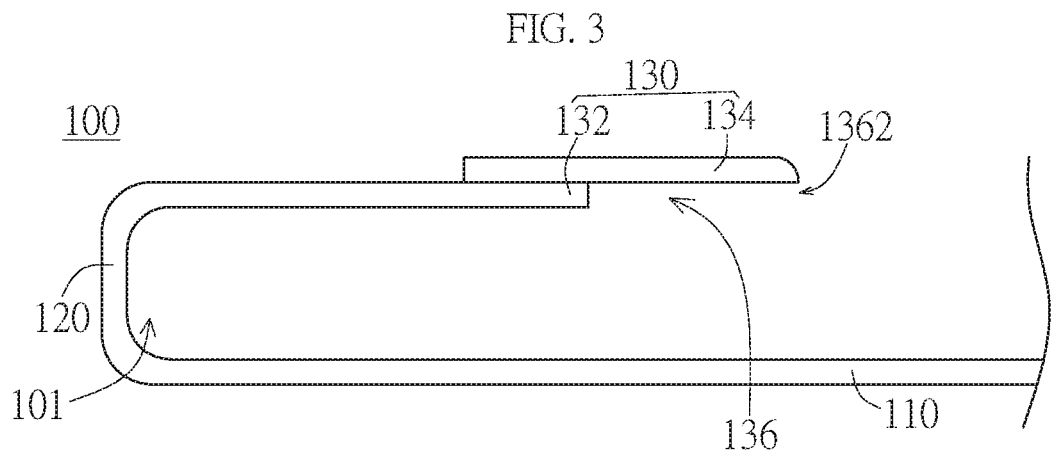
FIG. 4A and FIG. 4B are schematic cross-sectional views of FIG. 3 along cutting lines AA and BB, respectively.
Figure 4B:
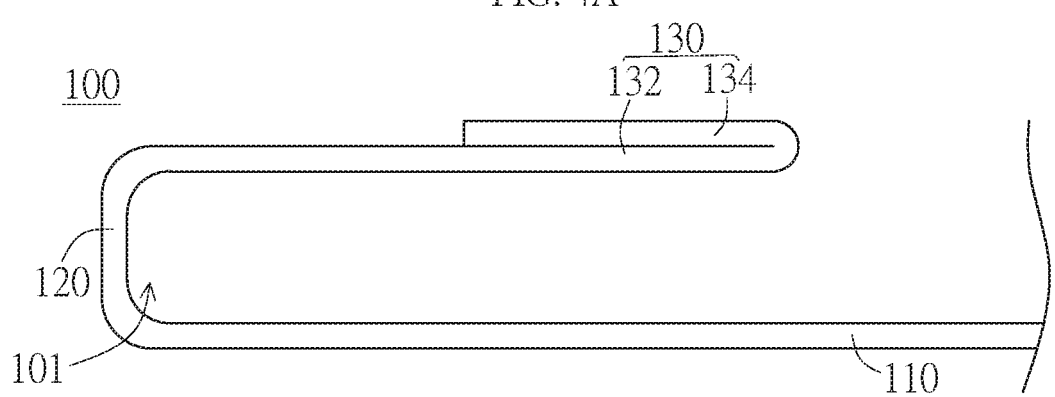

Referring to FIG. 3, FIG. 4A and FIG. 4B, FIG. 3 is a schematic view of the bezel of FIG. 1; FIG. 4A and FIG. 4B are schematic cross-sectional views of FIG. 3 along cutting lines AA and BB, respectively. As shown in FIG. 3, FIG. 4A and FIG. 4B, in an embodiment, the bezel 100 includes a bottom 110, a sidewall 120, and a top 130. The sidewall 120 is connected between the bottom 110 and the top 130 to enclose the light source space 101. When the light source unit 200 is disposed on the bezel 100, the light source 210 is located in the light source space 101, and the light guide plate 220 is disposed on the bottom 110 and partially extends into the light source space 101 to correspond to the light source 210. Specifically, the top 130 and the bottom 110 are located on two opposite sides with respect to the light source space 101 such as upper side and lower side, respectively. The size of the top 130 is smaller than that of the bottom 110, so that the top 130 and the bottom 110 are partially overlapped, For example, the top 130 and the bottom 110 can be two plate portions, which extend along the XY plane and overlap with each other in the Z-axis direction with the light source space 101 therebetween. The sidewall 120 can be a side plate, which extends along the YZ plane and is connected between the top 130 and the bottom 110. As such, the bezel 100 defines the light source space 101 between the bottom 110 and the top 130, i.e., the light source space 101 is enclosed by the top 130, the sidewall 120, and the bottom 101.

The top 130 includes the first portion 132 and the second portion 134. The first portion 132 is connected to the sidewall 120, and the second portion 134 is disposed on the first portion 132 away from the bottom 110 and covers the groove 136. Specifically, the groove 136 is arranged corresponding to the ear portion (e.g., 312) of the optical film (e.g. 310) on one side of the first portion 132, such as the side away from the sidewall 120. The number, location, and shape of the groove 136 correspond to those of the ear portion of the optical film. As such, the groove 136 is formed through the first portion 132 in the thickness direction of the first portion 132, e.g., the Z-axis direction, so that an opening 1362 of the groove 136 is formed at an edge of the first portion 132 away from the sidewall 120. The ear portion is inserted into the groove 136 from the opening 1362. The second portion 134 is stacked on the first portion 132 and covers the groove 136, so that the groove 136 can be considered as a blind hole, which is partially recessed from the top 130 along the thickness direction (e.g., Z-axis direction) and communicates with the light source space 101. In other words, the depth of the groove 136 recessed into the top 130 along the thickness direction is the thickness of the first portion 132, and the groove 136 is opened at the edge of the top 130 (e.g., adjacent to the first end 1342) to form the opening 1362.

Figure 5A:
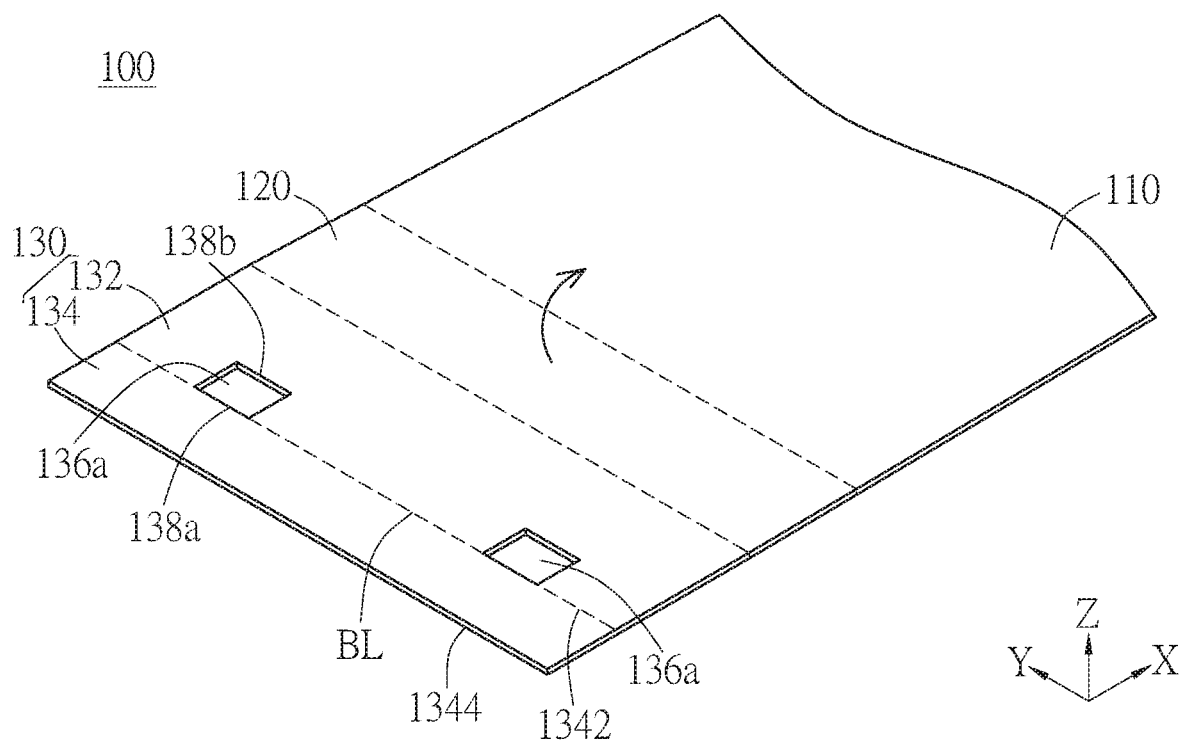
FIG. 5A and FIG. 5B are schematic views of an embodiment of the invention showing the manufacture of the bezel of FIG. 3.
Figure 5B:
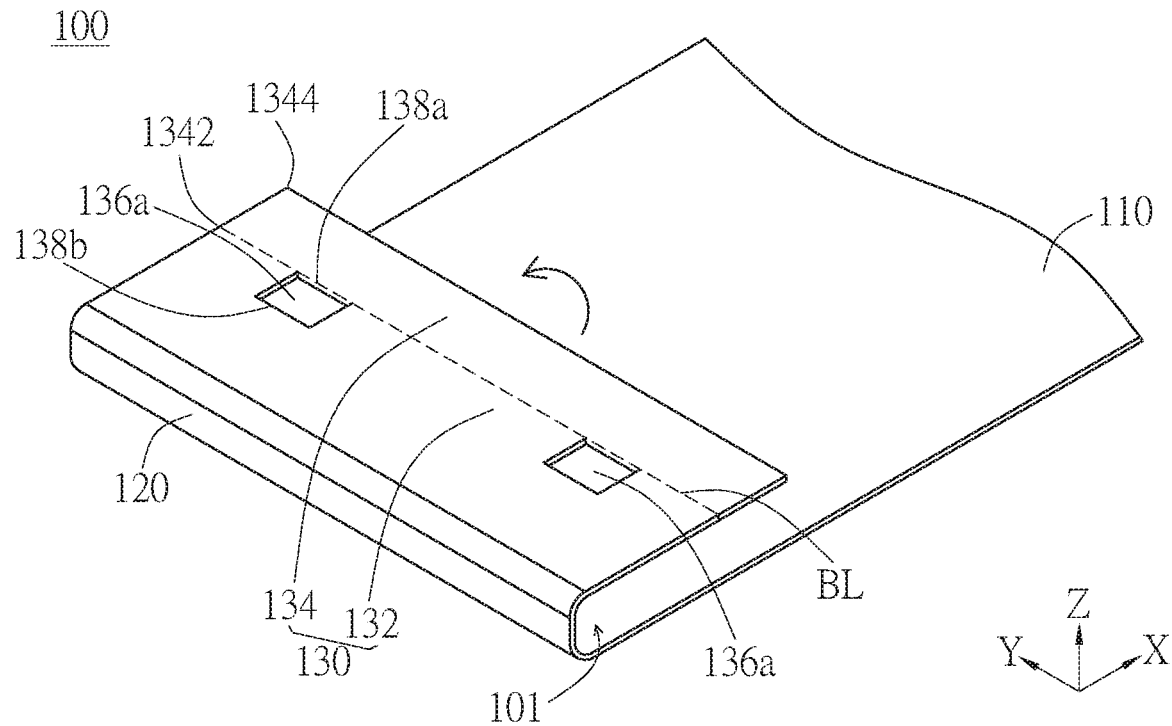

The material of the bezel 100 can be metal, such as iron, aluminium, or any suitable metal materials or alloys, but not limited thereto. The bottom 110, the sidewall 120, and the top 130 of the bezel 100 are preferably formed as an integral structure, which is preferably formed by bending a metal plate. Referring to FIG. 5A and FIG. 5B, schematic views of an embodiment showing the manufacture of the bezel 100 of FIG. 3 are illustrated. Specifically, the first portion 132 can have a through hole 136a, and the second portion 134 is connected to the first portion 132 and bent with respect to the first portion 132 to be stacked on the first portion 132, so that the through hole 136a becomes the groove 136 (shown in FIG. 3 and FIG. 4A). For example, as shown in FIG. 5A, the metal plate can sequentially include the top 130 including the second portion 134 and the first portion 132, the sidewall 120, and the bottom 110 along the X-axis direction from left to right, and the first portion 132 is connected between the sidewall 120 and the second portion 134. The second portion 134 has a first end 1342 and a second end 1344 opposite to each other. The first end 1342 is connected to the first portion 132. In addition, at least one through hole 136a (e.g., two) is pre-formed on the metal plate at a location corresponding to the top 130, and the through hole 136a penetrates the metal plate along the thickness direction, e.g., Z-axis direction. The outer rims 138a of two through holes 136a are aligned with the boundary line BL of the first portion 123 and the second portion 134, and the inner rims 138b of the through holes 136a are located between the outer rims 138a and the sidewall 120. The metal plate is bent 90 degrees clockwise twice to define the relative positions of the bottom 110, the sidewall 120, and the top 130 as shown in FIG. 5B, so that the sidewall 120 is connected between the first portion 132 and the bottom 110, and the second portion 134 extends from the first portion 132 to directly face the bottom 110. Then, the second portion 134 is substantially bent by 180 degrees relative to the first portion 132 along an edge of the through hole 136a adjacent to the first end 1342, such as along the outer rim 138a, so that the through hole 136a becomes the groove 136 with the opening 1362 at the first end 1342 after bending, and the groove 136 extends from the first end 1342 toward the second end 1344. In other words, the second portion 134 is bent toward the sidewall 120 (i.e., counterclockwise toward the first portion 132) along the boundary line BL of the first portion 132 and the second portion 134, so that the second portion 134 is folded on the first portion 132 at the outer side with respect to the light source space 101 to cover on the through hole 136a. As such, the through hole 136a of the first portion 132 is covered by the second portion 134 to form the groove 136, so that the groove 136 is opened toward the light source space 101 and extends to the edge of the top 130 (i.e., the boundary line BL or the first end 1342) to form the opening 1362, and the groove 136 is limited by the second portion 134 in the Z-axis direction to prevent the first ear 312 from escaping from the groove 136.

Figure 6:
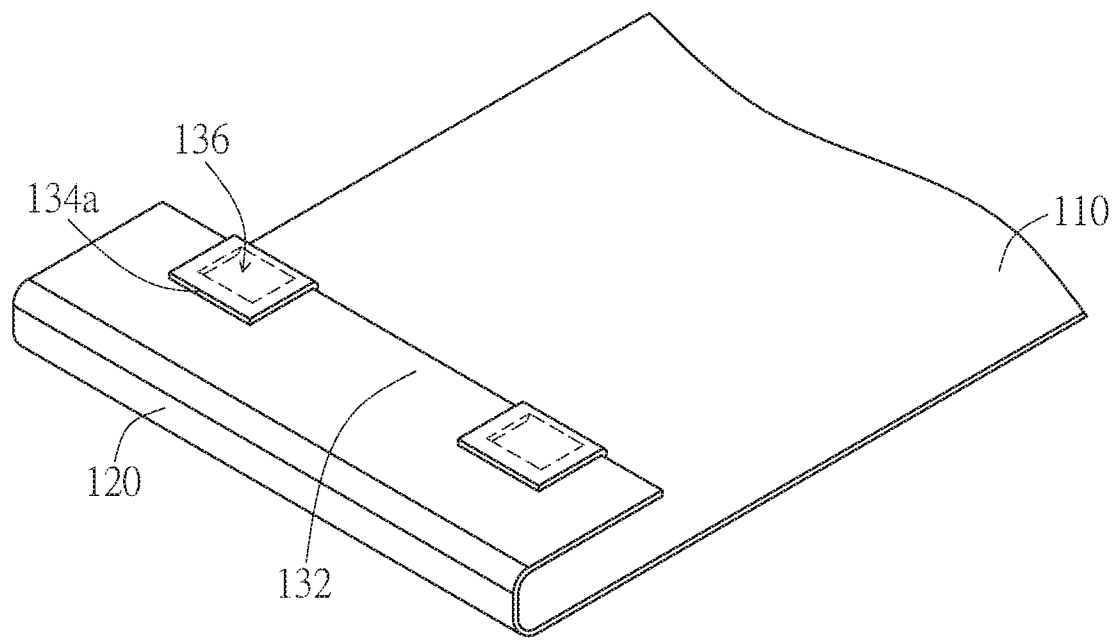
FIG. 6 is a schematic view of a variant embodiment of the bezel of FIG. 3.

As shown in FIG. 3, in this embodiment, the second portion 134 covers the first portion 132 to form a substantially flat plane on the first portion 132. Specifically, the second portion 134 preferably has a size corresponding to that of the first portion 132 in the disposition direction of the grooves 136 (e.g., the Y-axis direction), so that the second portion 134 substantially completely and continuously covers on one or more grooves 136 along the disposition direction of the grooves 136, and a substantially continuous plane can be formed over the one or more grooves 136 to not only prevent the ear portion(s) from escaping from the groove(s) 136 but also facilitate the integration with other components of the display device, such as display panel or support frame, but not limited thereto. In another embodiment, as shown in FIG. 6, the second portion 134 may include one or more second sub-portions 134a. The one or more second sub-portions 134a can be formed along the disposition direction of the grooves 136 (e.g., the Y-axis direction), so that the one or more second sub-portions 134a can cover on the one or more grooves 136 along the disposition direction, respectively, and a non-continuous plane can be formed over the one or more grooves 136 by the sub-portions 134a. In other words, multiple second sub-portions 134a can be disposed at intervals corresponding to the grooves 136 to form a non-continuous plane over the first portion 132. In this embodiment, each of the second sub-portions 134a preferably has a size larger than that of the corresponding groove 136, so that when the second sub-portions 134a are stacked on the first portion 132, each of the second sub-portions 134a completely covers the corresponding groove 136 and partially overlaps a portion of the first portion 132 around the groove 136, but not limited thereto. In a further embodiment, when the second portion 134 or the second sub-portion(s) 134a is stacked or folded on the first portion 132, the one or more grooves 136 can be partially covered along the extension direction (e.g., X-axis direction). Specifically, the width of the second portion 134 or the second sub-portion 134a from the first end 1342 to the second end 1344 can be smaller than the distance between the outer rim 138a to the inner rim 138b of the groove 136.

Figure 7:
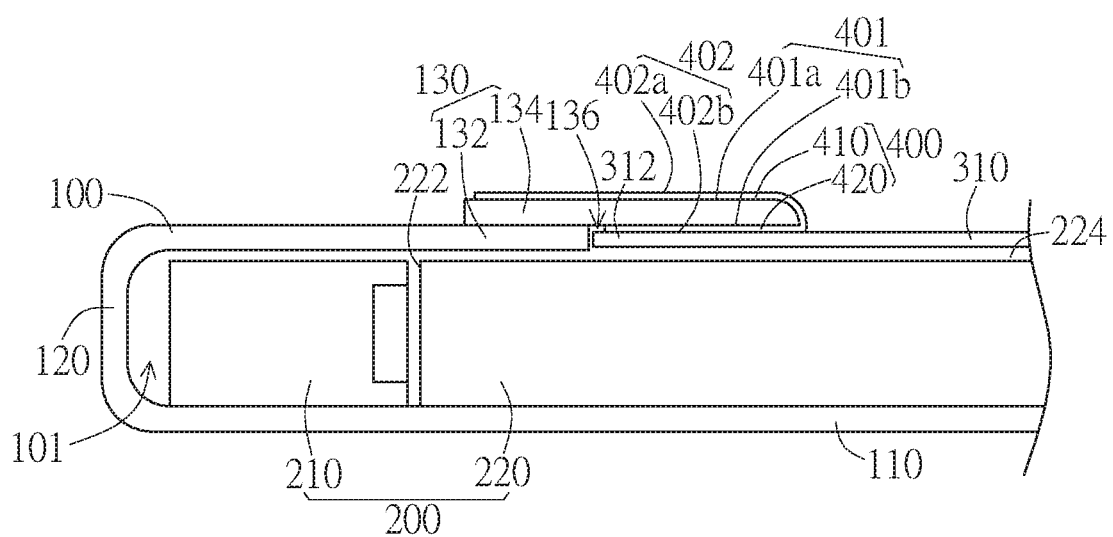
FIG. 7 is a schematic cross-sectional view of another embodiment of the backlight module of the display device of the invention.

Referring to FIG. 7, FIG. 7 is a schematic cross-sectional view of another embodiment of the backlight module of the display device of the invention. As shown in FIG. 7, the backlight module further include a first adhesive member 400. The first adhesive member 400 is configured to adhere the second portion 134 and the ear portion, such as the first ear portion 312, to enhance the positioning of the optical film. Specifically, the first adhesive member 400 can be embodied as a double-sided tape with adhesives at both sides, so that the first adhesive member 400 have a first adhesive surface 401 and a second adhesive surface 402 opposite to each other. The first adhesive member 400 is configured to adhere the upper surface of the second portion 134 (i.e., the surface of the second portion 134 that faces away from the first portion 132) and the lower surface of the second portion 134 (i.e., the surface of the second portion 134 that faces the first portion 132) by the first adhesive surface 401. The first adhesive member 400 is configured to adhere the upper surface of the first ear portion 312 by the second adhesive surface 402. For example, the first adhesive member 400 adheres the upper surface of the second portion 134 by the first adhesive surface 401 and then a portion of the first adhesive member 400 is bent into the groove 136, so that the portion of the first adhesive member 400 extending into the groove 136 adheres the lower surface of the second portion 134 by the first adhesive surface 401 and adheres the upper surface of the first ear portion 312 by the second adhesive surface 402. Moreover, the second adhesive surface 402 of the first adhesive member 400 is partially exposed on the upper surface of the second portion 134 to adhere or affix other components of the display device, such as the display panel.

Figure 8:
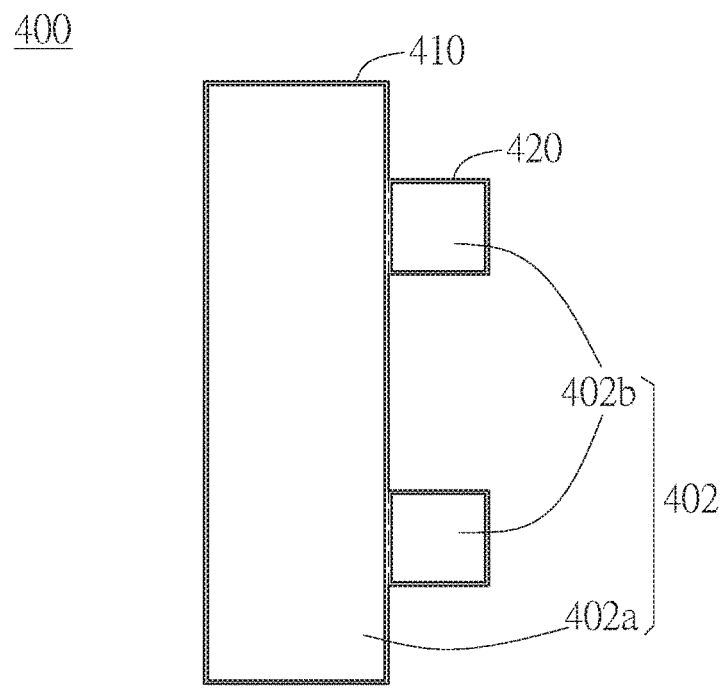
FIG. 8 is a schematic view of an embodiment of the first adhesive member.

FIG. 8 is a schematic view of an embodiment of the first adhesive member. As shown in FIG. 8, in this embodiment, the first adhesive member 400 includes a first adhesive portion 410 and at least a second adhesive portion 420. The second adhesive portion 420 is disposed corresponding to the groove 136. The first adhesive portion 410 is attached to the upper surface of the second portion 134, and the second adhesive portion 420 is bent into the groove 136 to adhere the upper surface of the first ear portion 312 and the lower surface of the second portion 134. Specifically, as shown in FIG. 7 and FIG. 8, the first adhesive portion 410 can have a shape and a size at least corresponding to the second portion 134, such as a stripe shape extending along the Y-axis direction. The number and size of the second adhesive portion 420 preferably correspond to those of the groove 136. For example, the at least a second adhesive portion 420 protrudes from one side of the first adhesive portion 410 and extends along the X-axis direction, so that the first adhesive member 400 can have a T-shape or a comb shape according to the number of the second adhesive portions 420. For example, the first adhesive surface 401 includes a first surface portion 401*a* corresponding to the first adhesive portion 410 and a second surface portion 401*b* corresponding to the second adhesive portion 420. The second adhesive surface 402 includes a first surface portion 402*a* corresponding to the first adhesive portion 410 and a second surface portion 402*b* corresponding to the second adhesive portion 420. When the first adhesive member 400 adheres the second portion 134 and the first ear portion 312, the first surface portion 401*a* of the first adhesive surface 401 corresponding to the first adhesive portion 410 adheres the upper surface of the second portion 134, and the first surface portion 402*a* of the second adhesive surface 402 corresponding to the first adhesive portion 410 is configured to adhere other components of the display device. The second adhesive portion 420 is bent relative to the first adhesive portion 410 into the groove 136, so that the second surface portion 401*b* of the first adhesive surface 401 corresponding to the second adhesive portion 420 adheres the lower surface of the second portion 134, and the second surface portion 402*b* of the second adhesive surface 402 corresponding to the second adhesive portion 420 adheres the upper surface of the ear portion 312.

In the above embodiment, the second adhesive portion 420 protrudes relative to the first adhesive portion 410 to form the T-shaped or comb shaped first adhesive member 400, but not limited thereto. According to practical applications, in another embodiment (not shown), the first adhesive member can be cut at positions corresponding to the groove 136 to define the first adhesive portion 410 and the second adhesive portion 420, which are partially separated, so that the second adhesive portion 420 can be bent into the groove 136, and the first adhesive portion 410 can also be bent to adhere the lower surface of the first portion 132.

According to the materials of components to be adhered, the first adhesive surface 401 and the second adhesive surface 402 may include the same adhesive or different adhesives to achieve the desired adhesion. Moreover, the first surface portion 402*a* of the second adhesive surface 402 corresponding to the first adhesive portion 410 and the second surface portion 402*b* of the second adhesive surface 402 corresponding to the second adhesive portion 420 may include the same adhesive or different adhesives to achieve the suitable adhesion. As shown in FIG. 8, in an embodiment, the first surface portion 402*a* of the second adhesive surface 402 corresponding to the first adhesive portion 410 and the second surface portion 402*b* of the second adhesive surface 402 corresponding to the second adhesive portion 420 are preferably two separate portions, so that the second adhesive surface 402 is a non-continuous adhesive surface, but not limited thereto. In another embodiment, the first surface portion 402*a* of the second adhesive surface 402 corresponding to the first adhesive portion 410 and the second surface portion 402*b* of the second adhesive surface 402 corresponding to the second adhesive portion 420 can be connected to each other, so that the second adhesive surface 402 is a continuous adhesive surface.

Figure 9:
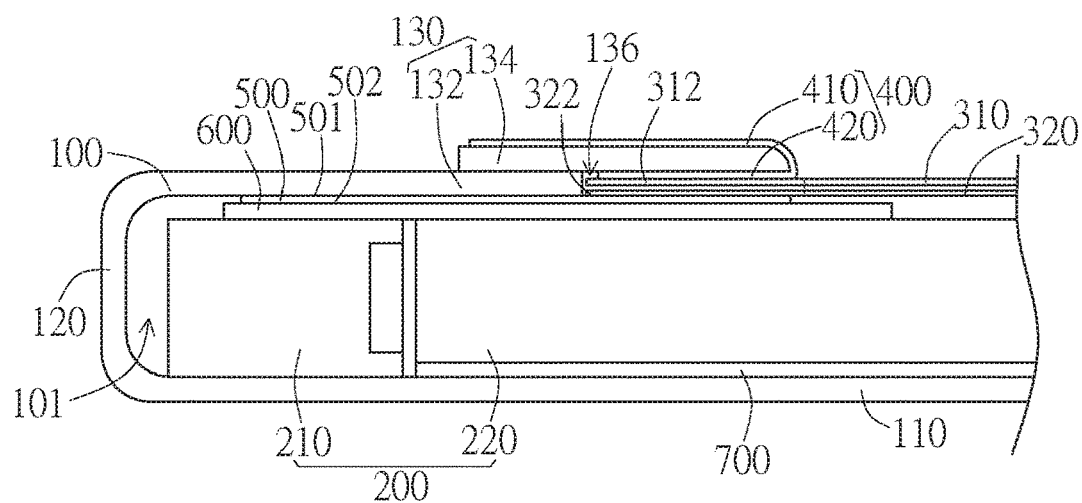
FIG. 9 is a schematic cross-sectional view of yet another embodiment of the backlight module of the display device of the invention.

FIG. 9 is a schematic cross-sectional view of yet another embodiment of the backlight module of the display device of the invention. As shown in FIG. 9, the backlight module further includes a second optical film 320 and a second adhesive member 500. The second optical film 320 is disposed adjacent to the light guide plate 220 and has a second ear portion 322 received in the groove 136. The second adhesive member 500 adheres the lower surface of the first portion 132 and the second ear portion 322. Specifically, when the at least one optical film include the first optical film 310 and the second optical film 320, the first optical film 310 and the second optical film 320 are stacked or laminated on each other, and the first ear portion 312 and the second ear portion 322 are received in the same groove 136. The second adhesive member 500 is disposed under the first portion 132 to adhere the lower surface of the first portion 132 and the lower surface of the second ear portion 322 at the same time, so as to further firmly position the optical film. In this embodiment, the first optical film 310 and the second optical film 320 are illustrated as individual optical films, but not limited thereto. In another embodiment, the first optical film 310 and the second optical film 320 can be the same optical film, and the first ear portion 312 and the second ear portion 322 are the same ear portion, so that the second adhesive member 500 can be considered to adhere the lower surface of the first portion 132 and the lower surface of the first ear portion 312. From another aspect, when the at least one optical film is embodied as a single optical film or a stack of optical films, one or more ear portions received in the same groove 136 can be considered as a single ear portion, and the second adhesive member 500 can be considered to adhere the lower surface of the first portion 132 and the lower surface of the single ear portion. In other words, the first adhesive member 400 adheres the uppermost surface of the one or more ear portions received in the groove 136, such as the upper surface of the first ear portion 312, and the second adhesive member 500 adheres the lowermost surface of the one or more ear portions received in the groove 136, such as the lower surface of the second ear portion 322.

Referring to FIG. 9, the backlight module further includes a reflective film 600. The reflective film 600 is at least partially located in the light source space 101 between the light guide plate 220 and the second optical film 320. The second adhesive member 500 further adheres the reflective film 600 and the first portion 132 as well as the second ear portion 322. Specifically, the reflective film 600 is disposed along the light source space 101 and configured to reflect the light leaking from the side of the light guide plate 220, so as to improve the usability of the light. The second adhesive member 500 is disposed corresponding to the first portion 132 and preferably not extending beyond the light source space 101. For example, the second adhesive member 500 can be embodied as a double-sided tape with adhesives at both sides, so that the second adhesive member 500 has a first adhesive surface 501 and a second adhesive surface 502. The first adhesive surface 501 of the second adhesive member 500 adheres the lower surface of the first portion 132 and the lower surface of the second ear portion 322, and the second adhesive surface 502 of the second adhesive member 500 adheres the reflective film 600. Moreover, the backlight module further includes a reflective film 700. The reflective film 700 is disposed between the light guide plate 220 and the bottom 110 of the bezel 100 and configured to reflect the light emitted from the light guide plate 220 toward the bottom 110 of the bezel 100, so as to improve the usability of the light.

Figure 10:
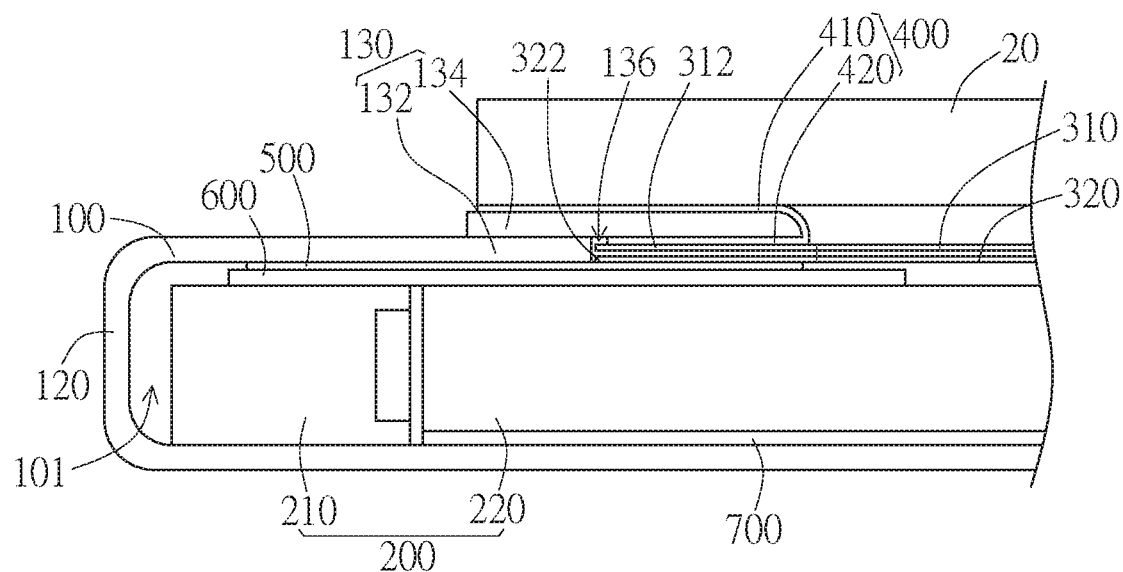
FIG. 10 is a schematic view of an embodiment of the display device of the invention.

FIG. 10 is a schematic view of an embodiment of the display device of the invention. As shown in FIG. 10, the display device further includes a display panel 20, and the display panel 20 is disposed on the bezel 100. In this embodiment, the display panel 20 is disposed on the bezel 100 of the backlight module of FIG. 9, but not limited thereto. The display panel 20 can be disposed on the bezel 100 of any of the backlight modules of the above embodiments and located on the optical film (e.g., 310, 320) at a side away from the light guide plate 220. The display panel 20 is preferably a liquid crystal display panel, which cooperates with the backlight module 10 to display images. In other embodiments, the display panel 20 can be any suitable display panel, which can cooperate with the backlight module to display images. In this embodiment, the first adhesive portion 410 of the first adhesive member 400 preferably adheres the upper surface of the second portion 134 and the lower surface of the display panel 20. Specifically, when the first adhesive member 400 adheres the second portion 134 and the first ear portion 312, the first surface portion 401a of the first adhesive surface 401 corresponding to the first adhesive portion 410 adheres the upper surface of the second portion 134, and the first surface portion 402a of the second adhesive surface 402 corresponding to the first adhesive portion 410 adheres the lower surface of the display panel 20, so as to effectively position the display panel 20.

Figure 11:
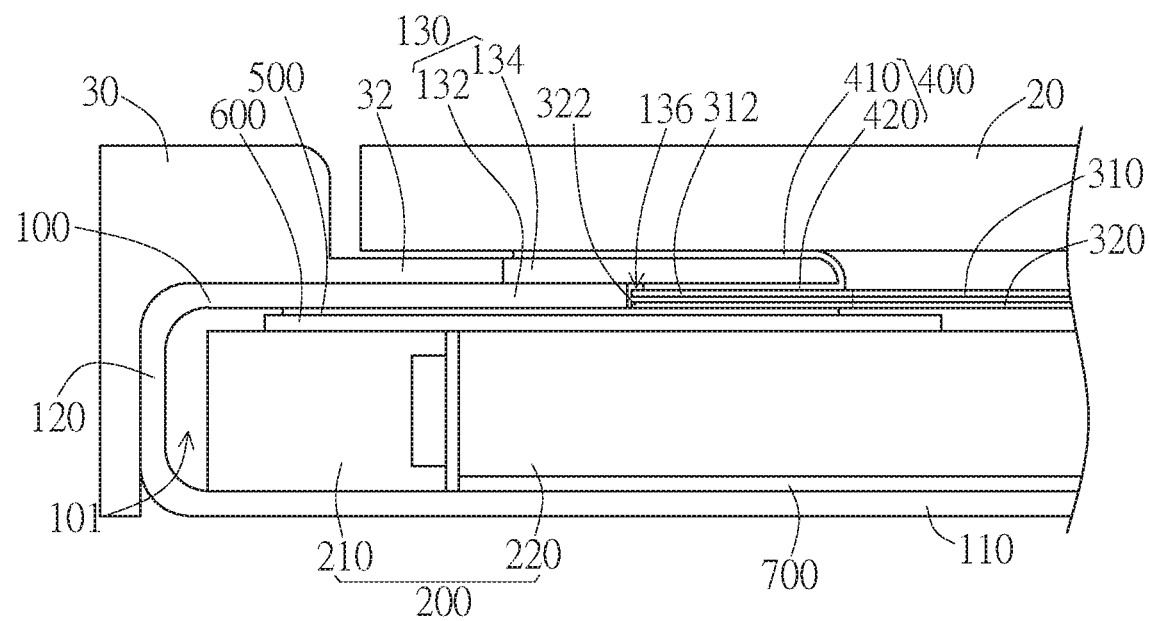
FIG. 11 is a schematic view of another embodiment of the display device of the invention.

Moreover, the display device of the invention having the bezel 100 with the second portion 134 stacked on the first portion 132 can further compensate the gap between the bezel 100 and other components to facilitate the assembly of the display device. As shown in FIG. 11, in another embodiment, the display device further include a support frame 30 for supporting the display panel 20. Specifically, the support frame 30 can be disposed corresponding to the bezel 100. The support frame 30 has a support portion 32, which at least partially extends above the bezel 100. For example, the support frame 30 can be disposed around the bezel 100, and a portion of the support frame 30 parallel to the top 130 of the bezel 100 can serve as the support portion 32 for supporting the display panel 20. In this embodiment, the support frame 30 can be a rectangular frame, and the support portion 32 is disposed at four sides of the bezel 100 and at least partially located on the first portion 132 and adjacent to the second portion 134. The thickness of the support portion 32 is preferably similar to the thickness of the second portion 134, so that the upper surfaces of the support portion 32 and the adjacent second portion 134 are substantially co-planar to stably support the display panel 20.

Although the preferred embodiments of the invention have been described herein, the above description is merely illustrative. The preferred embodiments disclosed will not limit the scope of the invention. Further modification of the invention herein disclosed will occur to those skilled in the respective arts and all such modifications are deemed to be within the scope of the invention as defined by the appended claims.

What is claimed is:

1. A display device, comprising:
    a backlight module, comprising:
        a bezel defining a light source space and having a first bezel portion and a second bezel portion, the first bezel portion disposed on one side of the light source space and having a groove, the second bezel portion disposed on one side of the first bezel portion away from the light source space and covering the groove, wherein the first bezel portion has a through hole; the second bezel portion is connected to the first bezel portion and bent with respect to the first bezel portion to be stacked on the first bezel portion, so that the through hole becomes the groove;
        a light source unit disposed on the bezel and partially located in the light source space; and
        a first optical film having a first ear portion, the first optical film disposed over the light source unit and the first ear portion received in the groove.

2. The display device of claim 1, wherein the second bezel portion covers the first bezel portion to form a substantially flat plane on the first bezel portion.

3. The display device of claim 1, wherein the second bezel portion has a first end and a second end opposite to each other; the first end is connected to the first bezel portion; the second end is substantially bent by 180 degrees relative to the first bezel portion along an edge of the through hole adjacent to the first end, and the groove extends from the first end toward the second end.

4. The display device of claim 1, wherein the bezel comprises a bottom, a sidewall, and a top; the sidewall is connected between the bottom and the top to enclose the light source space; the top comprises the first bezel portion and the second bezel portion, and the first bezel portion is connected to the sidewall.

5. The display device of claim 1, wherein the light source module further comprises a first adhesive member; the first adhesive member is configured to adhere the second bezel portion and the first ear portion.

6. The display device of claim 5, wherein the first adhesive member comprises a first adhesive portion and a second adhesive portion; the second adhesive portion is disposed corresponding to the groove; the first adhesive portion is attached to an upper surface of the second bezel portion, and the second adhesive portion is bent into the groove to adhere an upper surface of the first ear portion and a lower surface of the second bezel portion.

7. The display device of claim 6, wherein the first adhesive member has a first adhesive surface and a second adhesive surface opposite to each other; a first surface portion of the first adhesive surface corresponding to the first adhesive portion adheres the upper surface of the second bezel portion; a second surface portion of the first adhesive surface corresponding to the second adhesive portion adheres the lower surface of the second bezel portion, and a portion of the second adhesive surface corresponding to the second adhesive portion adheres the upper surface of the ear portion.

8. The display device of claim 7, wherein the first adhesive surface and the second adhesive surface comprise the same adhesive or different adhesives, and the first surface portion of the second adhesive surface corresponding to the first adhesive portion and the second surface portion of the second adhesive surface corresponding to the second adhesive portion comprise the same adhesive or different adhesives.

9. The display device of claim 6, further comprising a display panel, wherein the display panel is disposed on the bezel, and the first adhesive portion adheres the upper surface of the second bezel portion and the display panel.

10. The display device of claim 1, wherein the light source unit comprises a light source and a light guide plate; the backlight module further comprises a second optical film and a second adhesive member; the light source is disposed in the light source space; the light guide plate is disposed corresponding to the light source; the second optical film is disposed adjacent to the light guide plate and has a second ear portion received in the groove; the second adhesive member adheres a lower surface of the first bezel portion and the second ear portion.

11. The display device of claim 10, wherein the backlight module further comprises a reflective film; the reflective film is at least partially located in the light source space between the light guide plate and the second optical film; the second adhesive member has a first adhesive surface and a second adhesive surface; the first adhesive surface of the second adhesive member adheres the lower surface of the first bezel portion and the second ear portion, and the second adhesive surface of the second adhesive member adheres the reflective film.

12. A display device, comprising:
 a backlight module, comprising:
  a bezel defining a light source space and having a first bezel portion and a second bezel portion, the first bezel portion disposed on one side of the light source space and having a groove, the second bezel portion disposed on one side of the first bezel portion away from the light source space and covering the groove;
  a light source unit disposed on the bezel and partially located in the light source space;
  a first optical film having a first ear portion, the first optical film disposed over the light source unit and the first ear portion received in the groove; and
  an adhesive member comprising a first adhesive portion attached to an upper surface of the second bezel portion and a second adhesive portion disposed corresponding to the groove, wherein the second adhesive portion is bent into the groove to adhere an upper surface of the first ear portion and a lower surface of the second bezel portion.

13. The display device of claim 12, wherein the adhesive member has a first adhesive surface and a second adhesive surface opposite to each other; a first surface portion of the first adhesive surface corresponding to the first adhesive portion adheres the upper surface of the second bezel portion; a second surface portion of the first adhesive surface corresponding to the second adhesive portion adheres the lower surface of the second bezel portion, and a portion of the second adhesive surface corresponding to the second adhesive portion adheres the upper surface of the ear portion.

14. The display device of claim 12, further comprising a display panel, wherein the display panel is disposed on the bezel, and the first adhesive portion adheres the upper surface of the second bezel portion and the display panel.

15. A display device, comprising:
 a backlight module, comprising:
  a bezel defining a light source space and having a first bezel portion and a second bezel portion, the first bezel portion disposed on one side of the light source space and having a groove, the second bezel portion disposed on one side of the first bezel portion away from the light source space and covering the groove;
  a light source unit comprising a light source disposed in the light source space and a light guide plate disposed on the bezel corresponding to the light source;
  a plurality of optical films disposed over the light source unit, one of the plurality of optical films disposed adjacent to the light guide plate and having an ear portion received in the groove; and
  an adhesive member adhering a lower surface of the first bezel portion and the ear portion.

16. The display device of claim 15, wherein the backlight module further comprises a reflective film; the reflective film is at least partially located in the light source space between the light guide plate and the one of the plurality of optical films; the adhesive member has a first adhesive surface and a second adhesive surface; the first adhesive surface of the adhesive member adheres the lower surface of the first bezel portion and the ear portion, and the second adhesive surface of the adhesive member adheres the reflective film.

* * * * *